(12) United States Patent
Ma et al.

(10) Patent No.: US 8,967,383 B1
(45) Date of Patent: Mar. 3, 2015

(54) PROCESSES FOR PRODUCING HIGH-BRIGHTNESS KAOLIN IN HIGH YIELDS, AND KAOLIN MATERIALS PRODUCED THEREFROM

(71) Applicant: KaMin LLC, Macon, GA (US)

(72) Inventors: Deqiang Ma, Warner Robins, GA (US); Charles Allen Newsome, Appling, GA (US); Aubrey Clay Smith, Cochran, GA (US); John Taylor, Juliette, GA (US); Richard Douglas Carter, Macon, GA (US)

(73) Assignee: KaMin, LLC, Macon, GA (US)

( * ) Notice: Subject to any disclaimer, the term of this patent is extended or adjusted under 35 U.S.C. 154(b) by 0 days.

(21) Appl. No.: 14/055,467

(22) Filed: Oct. 16, 2013

Related U.S. Application Data

(60) Provisional application No. 61/716,275, filed on Oct. 19, 2012.

(51) Int. Cl.
*B03B 1/00* (2006.01)
*C01B 33/40* (2006.01)
*C04B 33/04* (2006.01)

(52) U.S. Cl.
CPC ............... *C01B 33/40* (2013.01); *C04B 33/04* (2013.01)
USPC ............. 209/5; 209/10; 209/164; 209/166; 106/486; 423/118.1; 423/328.1

(58) Field of Classification Search
None
See application file for complete search history.

(56) References Cited

U.S. PATENT DOCUMENTS

| | | |
|---|---|---|
| 4,002,487 A | 1/1977 | Conley |
| 5,147,458 A | 9/1992 | Skipper et al. |
| 5,190,615 A | 3/1993 | Kunkle et al. |
| 5,810,998 A | 9/1998 | Arrington-Webb et al. |
| 6,007,618 A * | 12/1999 | Norris et al. .................. 106/487 |
| 6,186,335 B1 | 2/2001 | Arrington-Webb et al. |
| 6,200,377 B1 * | 3/2001 | Basilio et al. ................. 106/486 |
| 6,554,892 B1 | 4/2003 | Manasso et al. |
| 6,660,076 B2 | 12/2003 | Valadares et al. |
| 7,306,668 B2 | 12/2007 | Pring et al. |
| 7,875,151 B2 | 1/2011 | Johns et al. |
| 8,083,848 B2 | 12/2011 | Pruett et al. |
| 2001/0022282 A1* | 9/2001 | Nagaraj et al. .................... 209/5 |
| 2005/0252834 A1* | 11/2005 | Gorken et al. ................ 209/166 |

* cited by examiner

*Primary Examiner* — Steven Bos
(74) *Attorney, Agent, or Firm* — Altera Law Group, LLC

(57) ABSTRACT

The present disclosure teaches improved processes to produce high-brightness kaolins at high yields from various natural sources of crude kaolin. In some embodiments, a process for treating mined kaolin comprises: blunging kaolin material with water at high shear to form a slurry; introducing the slurry to one or more beneficiation units for flocculation of titania (e.g., anatase) and titania-associated impurities (e.g., iron); introducing a sodium silicate composition, or precursors thereof, to the beneficiation units, wherein the sodium silicate composition is characterized by a $Na_2O/SiO_2$ ratio selected from about 0.25 to about 2.5; and recovering a suspension comprising at least 70% of the kaolin clay. The selected sodium silicate composition enhances flocculation of the titania while maintaining dispersion of the kaolin clay in the slurry. One or more chemical leaching reactions generate a treated kaolin that is characterized by a brightness of about 90 or higher.

21 Claims, 6 Drawing Sheets

FIG. 4

| | 1 | 1.0 | 1.33 | 1.8 | 2.5 |
|---|---|---|---|---|---|
| Yield | 73.6 | 88.2 | 81.4 | 76.0 | 66.4 |
| Brightness | 89.94 | 87.22 | 89.23 | 90.68 | 91.24 |
| U Brightness | 85.76 | 81.79 | 84.21 | 86.11 | 87.42 |
| U b | 4.75 | 6.64 | 5.49 | 4.49 | 3.97 |
| b | 2.44 | 3.57 | 2.7 | 1.98 | 1.83 |
| TiO2 | 0.802 | 1.743 | 0.965 | 0.621 | 0.507 |

FIG. 6

| Verification of DOE predictions | Mine 1 | Mine 1 | Mine 2 | Mine 2 | Mine 1 | Mine 1 | Mine 2 | Mine 2 |
|---|---|---|---|---|---|---|---|---|
| Total BD (g) | 460 | 460 | 460 | 460 | 460 | 460 | 460 | 460 |
| % Kaolin from: Upper 87 crude, Feb- | 17 | 17 | 17 | 17 | 17 | 17 | 17 | 17 |
| % Kaolin from: Middle 90 Crude, Feb | 50 | 50 | 50 | 50 | 50 | 50 | 50 | 50 |
| % Kaolin from: Bottom 92 Crude, Fet | 33 | 33 | 33 | 33 | 33 | 33 | 33 | 33 |
| Meta (#/T) | 13.9 | 13 | 13.9 | 13 | | | | |
| Calgon (#/T) | 2.7 | 2.5 | 2.7 | 2.5 | 2.2 | 1.8 | 2.2 | 1.8 |
| NaOH (#/T) @ 50 % Active | | | | | 7.4 | 7.9 | 7.4 | 7.9 |
| N Brand SiO2 (#/T) @ 37.5 % Active | 7.2 | 9.8 | 7.2 | 9.8 | 7 | 6.9 | 7 | 6.9 |
| Salt (#/T) | | | | | 5 | 5.4 | 5 | 5.4 |
| O/F Yield (Flowable) | 76.8 | 73.5 | 75.1 | 72.9 | 78.8 | 77.7 | 77.3 | 77.0 |
| H2SO4, lb/t dry kaolin | 12.17 | 11.04 | 12.14 | 11.13 | 13.24 | 14.15 | 14.36 | 14.40 |
| Alum, #/t dry kaolin | 15.84 | 15.56 | 15.99 | 15.27 | 11.04 | 10.74 | 9.04 | 11.09 |
| pH after Adjuster 2 | 4.27 | 4.22 | 4.28 | 4.26 | 4.5 | 4.6 | 4.4 | 4.5 |
| O/F Product Unleached Brightness | 87.68 | 88.6 | 88.09 | 88.62 | 87.3 | 87.6 | 88.2 | 88.2 |
| O/F Product Unleached b | 4.11 | 3.43 | 3.85 | 3.3 | 4.4 | 4 | 3.9 | 3.5 |
| O/F Product Leached Brightness | 91.36 | 91.32 | 91.25 | 91.2 | 91.6 | 91.3 | 91.7 | 91.1 |
| O/F Product Leached b | 2.1 | 1.96 | 2.02 | 1.94 | 2 | 1.9 | 1.9 | 1.9 |
| O/F Product TiO2% by XRF | 0.367 | 0.425 | 0.389 | 0.511 | 0.446 | 0.537 | 0.41 | 0.517 |

PROCESSES FOR PRODUCING HIGH-BRIGHTNESS KAOLIN IN HIGH YIELDS, AND KAOLIN MATERIALS PRODUCED THEREFROM

PRIORITY DATA

This patent application claims priority to U.S. Provisional Patent App. No. 61/716,275, filed Oct. 19, 2012 for "PROCESSES FOR PRODUCING HIGH-BRIGHTNESS KAOLIN IN HIGH YIELDS, AND KAOLIN MATERIALS PRODUCED THEREFROM," which is hereby incorporated by reference herein.

FIELD

This disclosure relates to the production of purified kaolin clays, apparatus for producing kaolin clays, and kaolin materials and compositions.

BACKGROUND

Kaolinite, commonly known as kaolin clay, is a naturally occurring mineral with the chemical composition $Al_2Si_2O_5(OH)_4$. Kaolin clay is one of the most common minerals on earth, but deposits of commercial size and purity are relatively rare.

Sedimentary kaolins generally are contaminated with titanium minerals to the extent of about 1% to 4%, expressed as $TiO_2$. Titanium minerals in the clay fraction of sedimentary kaolin have been identified primarily as anatase, although small amounts of other minerals such as leucoxene and brookite also have been detected. These minerals are usually heavily stained by iron and as a result vary from yellow to dark brown in color.

Natural occurring kaolin clay deposits contain discoloring contaminants, such as iron and titanium minerals. Titanium minerals in kaolin usually occur as discolored particles and these, coupled with iron oxides and other ferriferous material, are largely responsible for the yellow-brown shade of many kaolins. Often a clay is rejected as being unsuitable for commercial use solely on the basis of brightness, even though its other physical properties, such as the viscosity of clay-water slurries and particle size, are within desired limits.

Much attention and research in the industry has focused on developing processes to increase the brightness of clays. In the water-wash process, crude clay is slurried, degritted, fractionated to the desired particle size and the resulting fractions leached with zinc or sodium dithionite at a pH of 3.5-4.0 to improve both brightness and shade. Brightness improvements due to dithionite leaching can be quite substantial; however, the increase in brightness is generally insufficient to make high-brightness products in the range of 90 GE brightness.

Therefore, other processing methods, such as selective sedimentation, magnetic separation, froth flotation, and selective flocculation, have been developed for use in conjunction with dithionite to improve the brightness of the leached products. These methods can be employed to produce both standard and high-brightness products from highly discolored starting materials by removing much of the iron-stained titanium and ferriferous material prior to the leaching step. Selective sedimentation, magnetic separation, froth flotation, and selective flocculation are processes designed to remove the highly discolored titanium impurities and iron oxides. The dithionite leach step solubilizes and removes a portion of the amorphous ferriferous impurities on the clay surface.

The most successful processes developed to date to improve the brightness of clays are those in which impurities, such as titanium and iron compounds, are removed by selective sedimentation, selective flocculation, more commonly referred to as Differential Flocculation of Anatase (DFA), and magnetic separation. All three processes produce a substantial amount of reject material which is often discarded.

There is a need in the art for improved processes that can produce high-quality, high-brightness kaolins, while at the same time, achieving high yield for good process economics. There is also a need for process adjustability and the ability to optimize the process depending on the feedstock, i.e. the source of kaolin reserves which can vary widely in impurities and other attributes.

SUMMARY OF THE DISCLOSURE

In some variations, a process for treating mined kaolin is provided, comprising:

(a) providing a kaolin material comprising kaolin clay and titania with titania-associated impurities, wherein the kaolin material is characterized by a crude brightness less than 90;

(b) blunging the kaolin material with water at high shear to form a slurry;

(c) introducing the slurry to one or more beneficiation units for flocculation of the titania and the titania-associated impurities;

(d) introducing an additive composition to the one or more beneficiation units, wherein the additive composition includes at least one compound that modifies both (i) the surface of the kaolin clay and (ii) the surface of the titania, to enhance flocculation of the titania-associated impurities while maintaining dispersion of the kaolin clay in the slurry; and (e) recovering a suspension comprising at least 70% of said kaolin clay and subjecting said suspension to one or more chemical leaching reactions to generate a treated kaolin that is characterized by a brightness of about 90 or higher.

In some embodiments, the process further comprises one or more chemical leaching reduction reactions that enhance brightness.

In some embodiments, the additive composition is inorganic. For example, the additive composition may be selected from silicates (e.g., sodium silicates). In various embodiments, the additive composition is selected from the group consisting of $CO$, $CO_2$, $N_2$, $NO$, $N_2O$, $NO_2$, $NH_3$, $O_2$, $OH^-$, $PO_4$, $H_2S$, $SO_2$, $Cl_2$, combinations thereof, and chemical compounds thereof with alkaline metals or earth metals.

In some embodiments, the additive composition is organic. For example, the additive composition is selected from alcohols, aldehydes, ketones, acids, hydrocarbons, nitrogenated hydrocarbons, silanes, or combinations thereof. In various embodiments, the additive composition is selected from the group consisting of $HCOOH$, $CH_3COOH$, $C_2H_5COOH$, $CH_2CHOOH$, $C_6H_5COOH$, $HOOC-COOH$, $NH_2CH_2COOH$, $RCHO$, $RCOCH_3$, $RCCH$, $C_5H_5N$, and combinations thereof, wherein R is H or any organic or inorganic functional group.

The process may further include introducing one or more additional metals, metal oxides, metal hydroxides, metal salts, minerals, and/or polymers to steps (b), (c), and/or (d) to adjust the dispersion of the kaolin clay in the slurry.

In some embodiments, the suspension comprises at least 75% (yield) of the kaolin clay to generate a treated kaolin that is characterized by a brightness of about 90 or higher. In some embodiments, the yield is 80%, or even higher, while maintaining a brightness of about 90 or higher. In certain embodiments, the treated kaolin is characterized by a brightness of about 91 or higher, such as about 91.5.

The suspension may be spray-dried to form kaolin beads. The kaolin beads may then be milled or pulverized to form a kaolin powder. Optionally, the suspension may be provided directly for sale, storage, or other use, rather than drying and milling to form a powder.

Other variations herein provide a process for treating mined kaolin, comprising:

(a) providing a kaolin material comprising kaolin clay and titania with titania-associated impurities, wherein the kaolin material is characterized by a crude brightness less than 90;

(b) blunging the kaolin material with water at high shear to form a slurry;

(c) introducing the slurry to one or more beneficiation units for flocculation of the titania and the titania-associated impurities;

(d) introducing a sodium silicate composition, or chemical precursors thereof, to the one or more beneficiation units, wherein the sodium silicate composition is characterized by a $Na_2O/SiO_2$ ratio selected from about 0.25 to about 2.5, and wherein the sodium silicate composition enhances flocculation of the titania while maintaining dispersion of the kaolin clay in the slurry; and (e) recovering a suspension comprising at least 70% of said kaolin clay and subjecting said suspension to one or more chemical leaching reactions to generate a treated kaolin that is characterized by a brightness of about 90 or higher.

The $Na_2O/SiO_2$ ratio may be selected from about 1.0 to about 2.0, in preferred embodiments. In some embodiments, the $Na_2O/SiO_2$ ratio is not 1.0, such as greater than 1.0. The $Na_2O/SiO_2$ ratio is, in certain embodiments, about 1.8.

Without being limited to any theories, it is believed that the sodium silicate composition may chemically modify the surface of the kaolin clay or the surface of the titania present, or both kaolin and titania surfaces. The sodium silicate composition (including the $Na_2O/SiO_2$) may be selected to optimize flocculation of the titania, dispersion of the kaolin clay, or both of these.

In some embodiments, the sodium silicate composition is introduced directly into the one or more beneficiation units. In these or other embodiments, the sodium silicate composition is introduced indirectly into the one or more beneficiation units via introducing chemical precursors of the sodium silicate composition. The chemical precursors then react in situ, at least in part, to generate the sodium silicate composition.

In some embodiments, the process further comprises introducing one or more additional metals, metal oxides, metal hydroxides, metal salts, minerals, and/or polymers to steps (b), (c), and/or (d) to adjust the dispersion of the kaolin clay in the slurry.

In some embodiments, the suspension comprises at least 75% or at least 80% (yield) of the kaolin clay to generate a treated kaolin that is characterized by a brightness of about 90 or higher. In certain embodiments, the treated kaolin is characterized by a brightness of about 91 or higher, such as a brightness of about 91.5.

The suspension may be spray-dried to form kaolin beads. The kaolin beads may then be milled or pulverized to form a kaolin powder. Optionally, the suspension may be provided directly for sale, storage, or other use, rather than drying and milling to form a powder.

Systems as described herein are configured for carrying out the disclosed processes.

This disclosure also provides treated kaolins produced by any of the disclosed processes. Products comprising the treated kaolins are disclosed.

BRIEF DESCRIPTION OF THE FIGURES

FIG. 4 summarizes the experimental data of Example 1.

FIG. 6 summarizes experimental data collected in Example 5.

DETAILED DESCRIPTION OF SOME EMBODIMENTS

Figure 1:
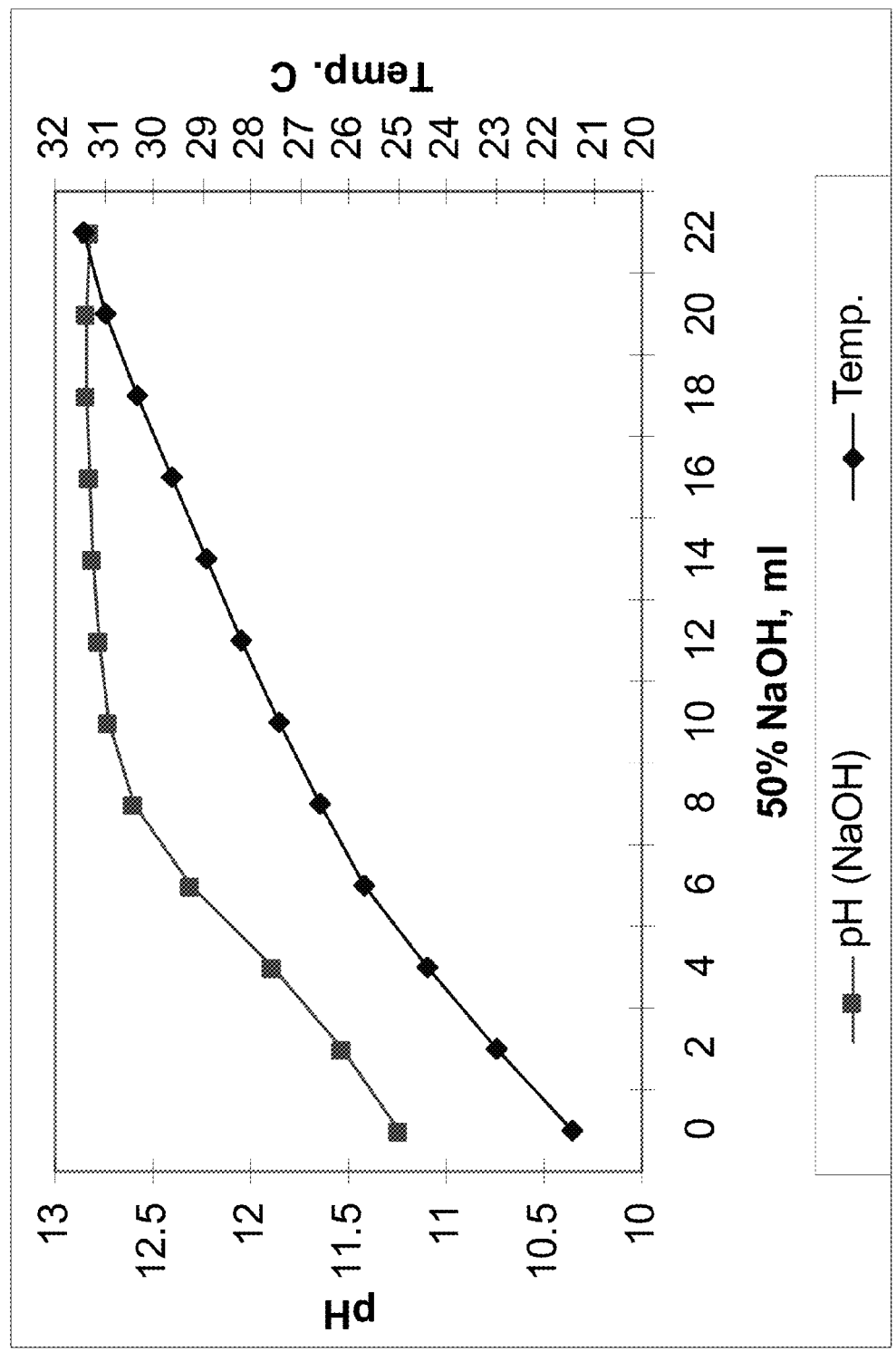
FIG. 1 shows silicate speciation as a function of NaOH added, in Example 1.

This description will enable one skilled in the art to make and use the principles of the disclosure, and it describes several embodiments, adaptations, variations, alternatives, and uses of the disclosure.

As used in this specification and the appended claims, the singular forms "a," "an," and "the" include plural referents unless the context clearly indicates otherwise. Unless defined otherwise, all technical and scientific terms used herein have the same meaning as is commonly understood by one of ordinary skill in the art to which this invention belongs. As used herein, a "composition," "blend," "compound," or "mixture" are all intended to be used interchangeably.

As used herein, the phase "consisting of" excludes any element, step, or ingredient not specified in the claim. When the phrase "consists of" (or variations thereof) appears in a clause of the body of a claim, rather than immediately following the preamble, it limits only the element set forth in that clause; other elements are not excluded from the claim as a whole. As used herein, the phase "consisting essentially of" limits the scope of a claim to the specified elements or method steps, plus those that do not materially affect the basis and novel characteristic(s) of the claimed subject matter.

With respect to the terms "comprising," "consisting of," and "consisting essentially of," where one of these three terms is used herein, the presently disclosed and claimed subject matter may include the use of either of the other two terms. Thus in some embodiments not otherwise explicitly recited, any instance of "comprising" may be replaced by "consisting of" or, alternatively, by "consisting essentially of."

Unless otherwise indicated, all numbers expressing parameters, conditions, concentrations, and so forth used in the specification and claims are to be understood as being modified in all instances by the term "about." Accordingly, unless indicated to the contrary, the numerical parameters set forth in the following specification and attached claims are approximations that may vary depending at least upon a specific analytical technique.

The examples described herein are examples of the disclosure, including examples of various embodiments as well as comparative examples. None of the examples should be construed as limiting the principles of the invention, or its application, in any way. All examples are exemplary only.

Some embodiments are premised on the discovery that in the process of separating titania (contaminated with titania-associated impurities) from kaolin, certain additive compositions are surprisingly effective for obtaining high-brightness kaolins in high yield.

As used herein, "kaolin" refers to kaolin clay or kaolinite mineral, having any degree of hydration. The principles taught herein apply to any suitable clay basic material including kaolin, bentonite, montmorillonite, synthetic layered silicates such as laponites, hectorites, as well as analogous aluminosilicate compositions which would be functionally equivalent. Preferred clay particles that may be treated by the disclosed processes comprise clays selected from the Kaolin group of minerals comprising kaolinite, dickite, halloysite, nacrite, montmorillite, or any other polymorph of $Al_2Si_2O_5(OH)_4$.

As used herein, "titania" is equivalent to titanium dioxide ($TiO_2$), also known as titanium(IV) oxide. Titania occurs in nature as well-known minerals rutile, anatase, and brookite. In naturally occurring kaolin deposits, titania is typically present primarily as anatase. Anatase is not an equilibrium phase of $TiO_2$, but it is kinetically stabilized (metastable). Any reference herein to "anatase," while being exemplary to typical kaolin deposits, is by no means meant to limit the scope of the invention.

Titania itself is widely used as a white pigment because of its brightness and high refractive index. However, in naturally occurring kaolin deposits, titania is, to varying degrees depending on source, closely associated with chemical impurities that impart undesirable color to the titania and thus to the kaolin. By "titania-associated impurities" as used herein, it is meant any chemical elements or compounds that are physically or chemically bound to $TiO_2$ particles (at the surface or within the bulk particles).

Titania-associated impurities include, but are not limited to, iron, iron oxide, or other metals, metal oxides, metal hydroxides, metal hydrates, metal salts, and so on. The titania-associated impurities may be weakly or strongly bonded physically (e.g. adsorbed, absorbed, or intercalated) to or in the titania, and/or may be chemically bonded to the surface or within a crystal structure. There may be bonds between $TiO_2$ and Fe, for example. Or, iron or iron oxide may be incorporated with titania into a single compound, such as $FeTiO_3$ (e.g., ilmenite).

Some titania-associated impurities will contribute undesirable properties to the kaolin, such as color. Color may be measured in a variety of ways. One indication of color is brightness of the kaolin. As used herein, "brightness" may refer to a variety of brightness measurements including, but not limited to, TAPPI brightness (e.g., TAPPI method T4400.284.02.WP), GE brightness, ISO brightness (e.g., ISO 2470), D65 brightness, or other scales typically from 0 to 100.

In some variations, a process for treating mined kaolin is provided, comprising:

(a) providing a kaolin material comprising kaolin clay and titania with titania-associated impurities, wherein the kaolin material is characterized by a crude brightness less than 90 (brightness of starting kaolin);

(b) blunging the kaolin material with water at high shear to form a slurry;

(c) introducing the slurry to one or more beneficiation units for flocculation of the titania and the titania-associated impurities;

(d) introducing an additive composition to the one or more beneficiation units, wherein the additive composition includes at least one compound that modifies both (i) the surface of the kaolin clay and (ii) the surface of the titania, to enhance flocculation of the titania-associated impurities while maintaining dispersion of the kaolin clay in the slurry; and (e) recovering a suspension comprising at least 70% of said kaolin clay and subjecting said suspension to one or more chemical leaching reactions to generate a treated kaolin that is characterized by a brightness of about 90 or higher.

The kaolin material may be mined (from open pits) from the ground. Or, the kaolin material may be received, such as from another party. If the kaolin material is mined from deposits, the mining location may be the same or different than that of the rest of the process.

The step (b) of blunging the kaolin material with water at high shear to form a slurry may be carried out at various solids concentrations, shear rates, residence times, temperatures, and additives. During blunging, de-gritting may take place. The blunging may take place at the source (mine) or at a location associated with steps (c)-(e).

For example, in some embodiments a dry clay crude after being blunged at 60-70% or higher solids is fed to a centrifuge to classify the particle size. It is possible to extend blunging time with more blunging energy to produce finer material, although there will be an economic optimum. Typically, a certain fraction of coarse particles including unblunged kaolin and impurities are rejected by a centrifuge as underflow, with overflow of the centrifuge moving forward for further processing. Step (b) may include one or more separate units for separations, shear mixing, storage, in addition to a blunger.

The one or more beneficiation units may be tanks, reactors, separators, columns, or other vessels known in the art. During steps (c) and (d), various functions may be accomplished such as reacting, aging, blending, separating, particle-sizing, purifying, or surface-modifying, in addition to flocculating.

The process preferably establishes a chemical dynamic balance between dispersing kaolin clay and flocculating titania. Thus, any particulate that can modify titania and/or kaolin clay surfaces through chemical bonding, specific site adsorption in a Stern layer, and/or adsorption through osmotic pressure and Donnan potential near a double layer, may be employed as part or all of the additive composition. A Stern layer is one of two electrically charged layers of electrolyte ions, the layer of ions immediately adjacent to the surface, in the neighborhood of a negatively charged surface. The Donnan potential relates to the distribution of ion species between two ionic solutions separated by a semipermeable boundary.

In some embodiments, the additive composition is inorganic. For example, the additive composition may be selected from silicates (e.g., sodium silicates). In various embodiments, the additive composition is selected from the group consisting of CO, $CO_2$, $N_2$, NO, $N_2O$, $NO_2$, $NH_3$, $O_2$, OH., $PO_4$, $H_2S$, $SO_2$, $Cl_2$, combinations thereof, and chemical compounds thereof with alkaline metals or earth metals.

In some embodiments, the additive composition is organic. For example, the additive composition is selected from alcohols, aldehydes, ketones, acids, hydrocarbons, nitrogenated hydrocarbons, silanes, or combinations thereof. In various embodiments, the additive composition is selected from the group consisting of HCOOH, $CH_3COOH$, $C_2H_5COOH$, $CH_2CHOOH$, $C_6H_5COOH$, HOOC—COOH, $NH_2CH_2COOH$, RCHO, $RCOCH_3$, RCCH, $C_5H_5N$, and combinations thereof, wherein R is H or any organic or inorganic functional group.

The process may further include introducing one or more additional metals, metal oxides, metal hydroxides, metal salts, minerals, acids, hydrocarbons, oxygenates, and/or cationic or anionic polymers to steps (b), (c), and/or (d), to adjust the dispersion of the kaolin clay in the slurry. In various embodiments, the process may include introducing one or more compounds selected from the group consisting of alum, aluminum chlorohydrate, aluminum sulfate, calcium oxide, calcium hydroxide, iron(II) sulfate, iron(III) chloride, polyacrylamide, polydiallyldimethylammonium chloride, sodium aluminate, chitosan, gelatin, cellulose, guar gum, alginates, lignin, fatty acids, fatty acid esters, alcohols, sodium chloride, potassium chloride, calcium chloride, sodium bromide, calcium bromide, and combinations thereof, optionally in addition to solvents, carrier fluids, water, and surfactants.

In some embodiments, the chemical leaching reactions in step (e) comprise reduction reactions that enhance brightness of the kaolin. Any known leaching chemistry may be employed. For example, an inorganic acid such as sulfuric acid or oxalic acid, or salts thereof, may be utilized. Sodium dithionite (also known as sodium hydrosulfite), a sodium salt of dithionous acid, may be utilized for the leaching. Alternatively, bioleaching may be employed, utilizing, for example, *A. niger* to catalyze the reduction reactions. The chemical leaching may be conducted at various pH and temperature, depending on selection or concentration of the reactants.

In some embodiments, the suspension comprises at least 75% (yield) of the kaolin clay to generate a treated kaolin that is characterized by a brightness of about 90 or higher. In some embodiments, the yield is 80%, or even higher, while maintaining a brightness of about 90 or higher. In certain embodiments, the treated kaolin is characterized by a brightness of about 91 or higher, such as about 91.1, 91.2, 91.3, 91.4, 91.5, 91.6, 91.7, 91.8, 91.9, or 92.

The suspension may be dried (e.g., spray-dried or flash-dried) to form kaolin beads. The kaolin beads may then be milled or pulverized to form a kaolin powder. Optionally, the suspension may be provided directly for sale, storage, or other use, rather than drying and milling to form a powder. When a spray dryer is employed, it will typically contain a set of nozzles to spray treated slurry in micron-sized beads, which are then dried in a heated air chamber. When a flash dryer is employed, it will typically utilize mechanical drying and mixing simultaneously in a heated chamber. Hot air will push dried ground material upward to a cyclone.

Other variations herein provide a process for treating mined kaolin, comprising:

(a) providing a kaolin material comprising kaolin clay and titania with titania-associated impurities, wherein the kaolin material is characterized by a crude brightness less than 90;

(b) blunging the kaolin material with water at high shear to form a slurry;

(c) introducing the slurry to one or more beneficiation units for flocculation of the titania and the titania-associated impurities;

(d) introducing a sodium silicate composition, or chemical precursors thereof, to the one or more beneficiation units, wherein the sodium silicate composition is characterized by a $Na_2O/SiO_2$ ratio selected from about 0.25 to about 2.5, and wherein the sodium silicate composition enhances flocculation of the titania while maintaining dispersion of the kaolin clay in the slurry; and (e) recovering a suspension comprising at least 70% of said kaolin clay and subjecting said suspension to one or more chemical leaching reactions to generate a treated kaolin that is characterized by a brightness of about 90 or higher.

The $Na_2O/SiO_2$ ratio is the average stoichiometric ratio, on a mole basis, of the sodium oxide ($Na_2O$) equivalent to the silica ($SiO_2$) equivalent in the sodium silicate structure(s) when in anion form. A given sodium silicate structure will be governed by a measurable $Na_2O/SiO_2$ ratio (by chemical analysis). Generally there will be a range of structures or morphologies in a sodium silicate composition, each governed by a $Na_2O/SiO_2$ ratio. The overall composition is effectively governed by an average $Na_2O/SiO_2$ ratio (hereinafter, "$Na_2O/SiO_2$ ratio"). Note that in this formulism, reference to $Na_2O$ and $SiO_2$ is not meant to imply that the sodium silicate composition is necessarily produced from $Na_2O$ and $SiO_2$.

The average $Na_2O/SiO_2$ ratio may be selected from about 1.0 to about 2.0, in preferred embodiments. In some embodiments, the $Na_2O/SiO_2$ ratio is not 1.0, such as greater than 1.0 (e.g., 1.01 or higher). The $Na_2O/SiO_2$ ratio is, in certain embodiments, about 0.3, 0.4, 0.5, 0.6, 0.7, 0.8, 0.9, 0.95, 1.0, 1.05, 1.1, 1.2, 1.3, 1.4, 1.5, 1.6, 1.7, 1.8, 1.9, 2.0, 2.1, 2.2, 2.3, or 2.4. The sodium silicate composition (including the $Na_2O/SiO_2$ ratio) may be selected to optimize flocculation of the titania, dispersion of the kaolin clay, or both of these.

Sodium silicate is not a unique molecule, but rather a class of molecules of varying structures (morphologies). When the $Na_2O/SiO_2$ ratio is varied, the silicate morphology changes. High ratios of $Na_2O/SiO_2$, such as about 2, encourage monomers (monosilicate), although chains and cyclic trimers are also expected. As the ratio of $Na_2O/SiO_2$ decreases, larger rings and branched rings are formed. Moving from low alkali to high alkali ($Na_2O$ or NaOH) generates a change in species distribution: from high monomer content and few complex structures to reduced monomer content and a greater number of complex structures. See Engelhardt et al., *Z. Anorg. Allg. Chem.*, 4188, 17-28 (1975), which is hereby incorporated by reference herein.

Silicate morphology variations, in turn, can alter its adsorption to $TiO_2$ and aluminosilicate (e.g., kaolin) surfaces. Such adsorption coupled with surface-potential-determining ions (such as $OH^-$) affects the Stern layer and adjacent areas of the double layer of particles. Without being limited to any theories, it is believed that the sodium silicate composition may chemically modify the surface of the kaolin clay or the surface of the titania present, or both kaolin and titania surfaces.

It is noted here that the nature of adsorption on $TiO_2$ and aluminosilicate is governed by charge and molecular structure of silicate, the nature of $TiO_2$ (i.e. perfect vs. defective surface), and aluminosilicate surface vs. edge charges. In addition, other electrolytes such as alkaline and earth metals, and other mineral contaminants such as smectite affects the surface potential and thus the dispersion of kaolin clay and flocculation of titania. Furthermore, $TiO_2$ bulk concentration, and especially surface concentration, and kaolin clay slurry concentration directly affect dispersion and flocculation through viscoelastic drag forces.

In some embodiments, the sodium silicate composition is introduced directly into the one or more beneficiation units. The sodium silicate composition may be provided from another party or may be produced from reactants. For example, sodium silicate may be produced from sodium carbonate and silica by high-temperature reactions (generally above 1000° C.), $Na_2CO_3 + SiO_2 \rightarrow Na_2SiO_3 + CO_2$. Alternatively, or additionally, sodium silicate may be produced from silica and sodium hydroxide, $2\ NaOH + SiO_2 \rightarrow Na_2SiO_3 + H_2O$.

In these or other embodiments, the sodium silicate composition is introduced indirectly into the one or more beneficiation units via introducing chemical precursors of the sodium silicate composition. The chemical precursors then react in situ, at least in part, to generate the sodium silicate composition.

For example, $SiO_2$ or $Na_2SiO_3$ (metasilicate) may be introduced, along with $Na_2O$ or NaOH, to form a sodium silicate composition in the process. In some embodiments, NaOH and $Na_2SiO_3$ are the raw materials used to control the $Na_2O/SiO_2$ ratio. NaOH and $Na_2O$ may be used interchangeably, since $Na_2O$ reacts quickly with water to form NaOH.

The process may further include introducing one or more additional metals, metal oxides, metal hydroxides, metal salts, minerals, acids, hydrocarbons, oxygenates, and/or cationic or anionic polymers to steps (b), (c), and/or (d), to adjust the dispersion of the kaolin clay in the slurry. In various embodiments, the process may include introducing one or more compounds selected from the group consisting of alum, aluminum chlorohydrate, aluminum sulfate, calcium oxide, calcium hydroxide, iron(II) sulfate, iron(III) chloride, sodium metaphosphate, sodium metasilicate, polyacrylamide, polydiallyldimethylammonium chloride, sodium aluminate, chitosan, gelatin, cellulose, guar gum, alginates, lignin, fatty acids, fatty acid esters, alcohols, sodium chloride, potassium chloride, calcium chloride, sodium bromide, calcium bromide, and combinations thereof, optionally in addition to solvents, carrier fluids, water, and surfactants.

In some embodiments, the chemical leaching reactions in step (e) comprise reduction reactions that enhance brightness of the kaolin. Any known leaching chemistry may be employed. For example, an inorganic acid such as sulfuric acid or oxalic acid, or salts thereof, may be utilized. Sodium dithionite (also known as sodium hydrosulfite), a sodium salt of dithionous acid, may be utilized for the leaching. The chemical leaching may be conducted at various pH and temperature, depending on selection or concentration of the reactants. The leaching chemistry is well-known in the art.

In some embodiments, the suspension comprises at least 75% or at least 80% (yield) of the kaolin clay to generate a treated kaolin that is characterized by a brightness of about 90 or higher. In certain embodiments, the treated kaolin is characterized by a brightness of about 91 or higher, such as a brightness of about 91.5.

Other variations provide a process for treating mined kaolin, comprising:

(a) providing a kaolin material comprising kaolin clay and titania with titania-associated impurities, wherein the kaolin material is characterized by a crude brightness less than 90;

(b) blunging the kaolin material with water at high shear to form a slurry;

(c) introducing the slurry to one or more beneficiation units for flocculation of the titania and the titania-associated impurities;

(d) introducing a sodium silicate composition, or chemical precursors thereof, to the one or more beneficiation units, wherein the sodium silicate composition is characterized by a $Na_2O/SiO_2$ ratio selected from about 0.25 to about 2.5, and wherein the sodium silicate composition enhances flocculation of the titania while maintaining dispersion of the kaolin clay in the slurry; and (e) recovering a suspension comprising at least 70% of said kaolin clay to generate a treated kaolin that is characterized by a brightness of about 85 or higher.

The suspension may be dried (e.g., spray-dried or flash-dried) to form kaolin beads. When a spray dryer is employed, it will typically contain a set of nozzles to spray treated slurry in micron-sized beads, which are then dried in a heated air chamber. The atomized droplets of clay form small beads that can be redispersed in water under high shear. Beads can also be dispersed in high-shear polymer processing equipment. When a flash dryer is employed, it will typically utilize mechanical drying and mixing simultaneously in a heated chamber. Hot air will push dried ground material upward to a cyclone.

The kaolin beads may then be milled or pulverized to form a kaolin powder. Dried beads are passed through a milling device. The milling device de-agglomerates the beads, but does not change the particle size distribution. Optionally, the suspension may be provided directly for sale, storage, or other use, rather than drying and milling to form a powder.

The processes disclosed may be conducted in batch, continuous, or semi-continuous fashion. Continuous processing is preferred.

The processes disclosed may be combined with a wide variety of other processing steps or methods, including but not limited to washing (with water or another solvent), delamination, chemical treatment, or calcination. Any of these steps may be performed before, during, or after steps (a)-(e) as disclosed herein.

Treated kaolins produced by any of the disclosed processes have many uses industrially. Products comprising the treated kaolins include, but certainly are not limited to, paper, paints, adhesives, plastics, inks, cements, filters, and catalysts.

EXAMPLES

Example 1

Influence of $Na_2O/SiO_2$ Ratio on Brightness and Yield

A solution of 50% NaOH is combined with $SiO_2$ to vary the $Na_2O/SiO_2$ ratio in sodium silicate, as shown in FIG. 1.

Figure 2:
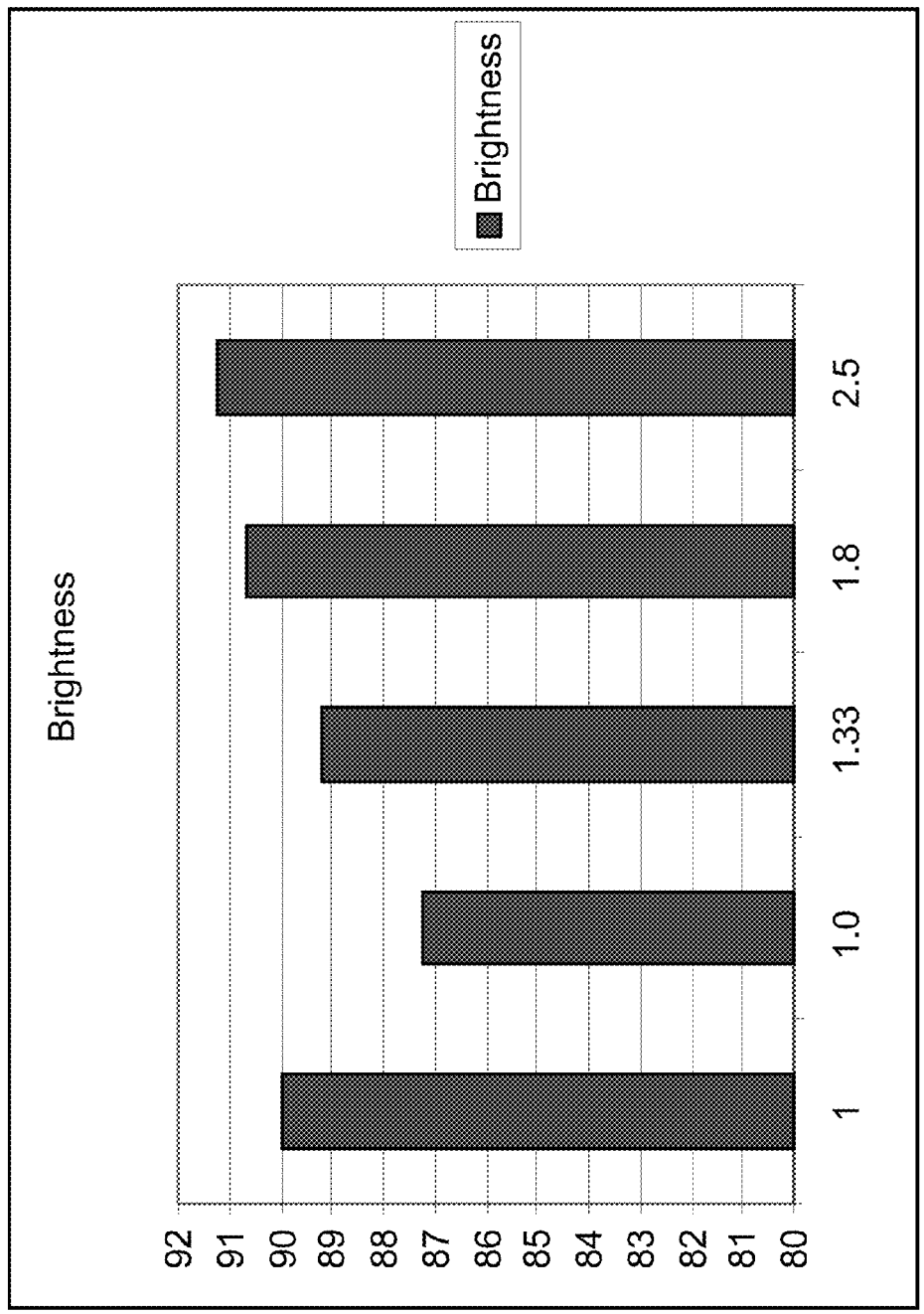
FIG. 2 summarizes the brightness of treated kaolins as a function of $Na_2O/SiO_2$ ratio, in Example 1.
Figure 3:
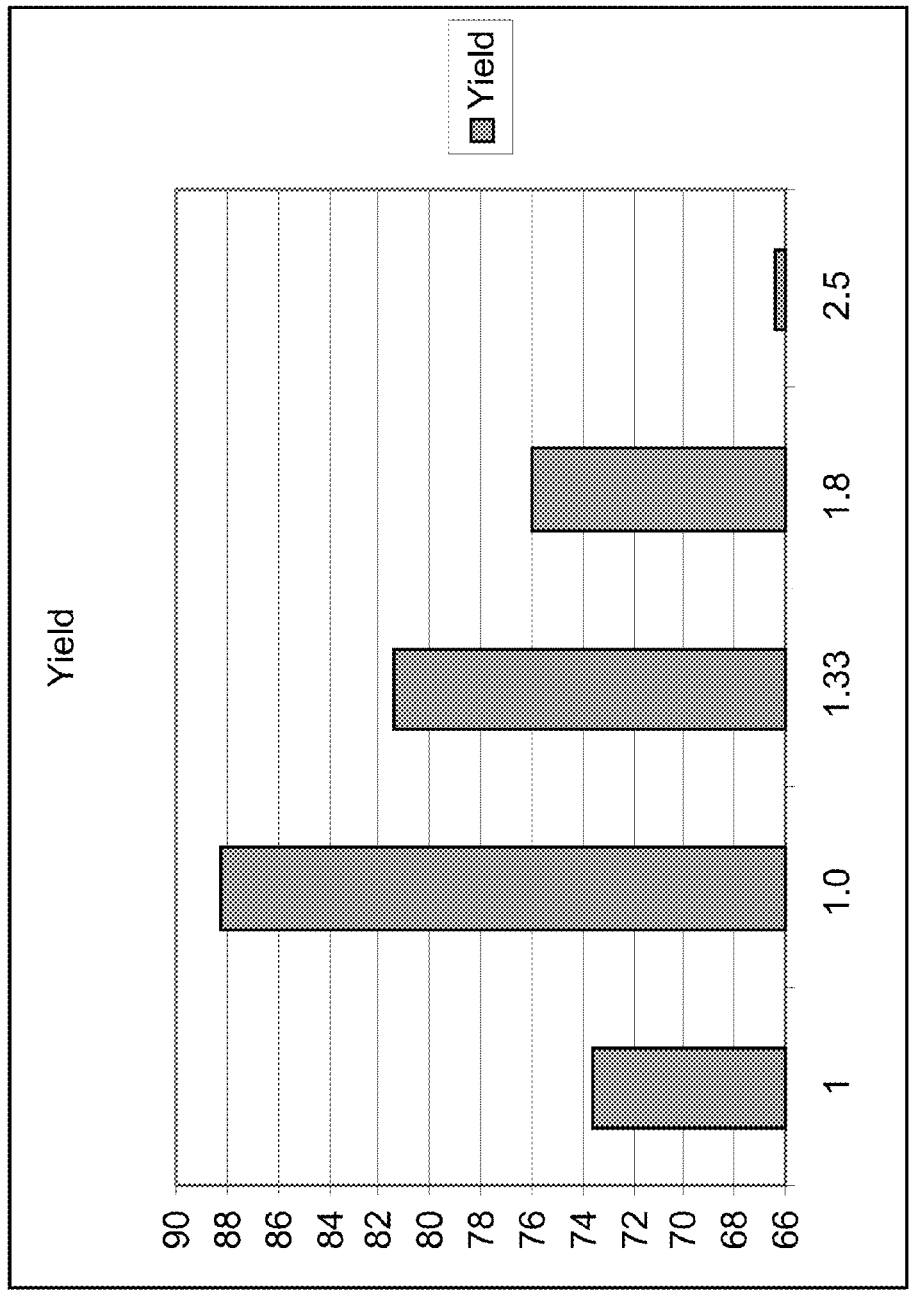
FIG. 3 summarizes the yield of treated kaolins as a function of $Na_2O/SiO_2$ ratio, in Example 1.

The influence of the $Na_2O/SiO_2$ ratio is explored in FIGS. 2-4. In these experiments, a $Na_2O/SiO_2$ ratio of 1 is used along with sodium hexametaphosphate and sodium chloride at a ratio of about 1:4 wt/wt (the first bar in each of FIGS. 2 and 3). Also $Na_2O/SiO_2$ ratios of 1.0, 1.33, 1.8, and 2.5 are used along with sodium hexametaphosphate and sodium chloride at a ratio of about 1:3 wt/wt.

FIG. 2 shows the brightness of the treated kaolin. FIG. 3 shows the yield obtained (treated kaolin as a percentage of starting kaolin material). FIG. 4 summarizes the experimental data, including yield, brightness, and titania content. Generally there is a trade-off between brightness and yield. However, the experiment at a $Na_2O/SiO_2$ ratio of 1.8 shows high brightness (about 91) at good yield (about 76%).

Example 2

Figure 5:
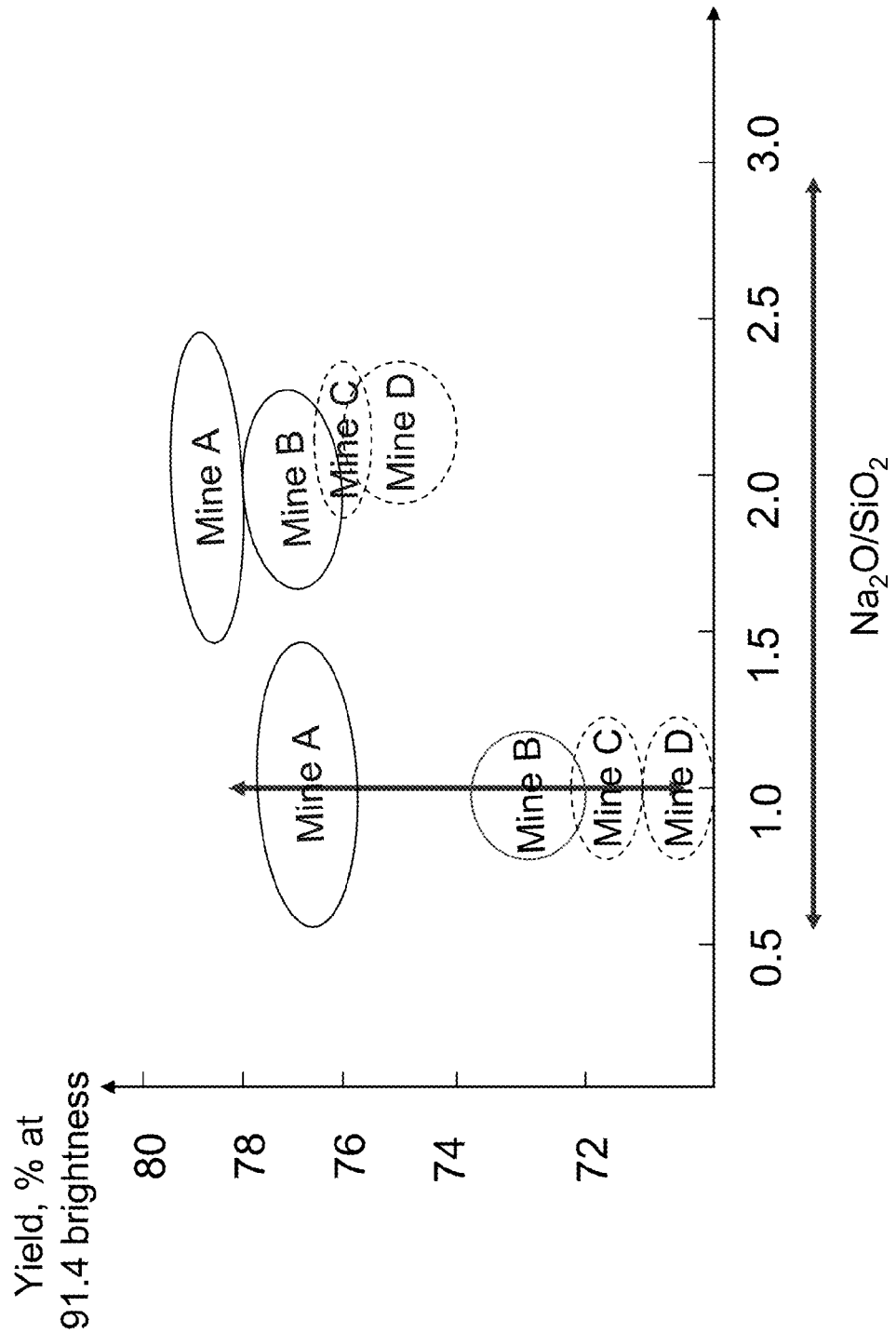
FIG. 5 demonstrates the production of high-brightness kaolins in high yields for four distinct kaolin reserves (mines), in Example 2.

Influence of $Na_2O/SiO_2$ Ratio on Yield of High-Brightness Kaolin from Various Mines FIG. 5 shows the results experimentally of the yield as a function of $Na_2O/SiO_2$ ratio, at constant brightness (91.4), for four distinct kaolin mines. Generally, the yields are higher at the higher $Na_2O/SiO_2$ ratios for any given mine. The four mines vary in the quality of the crude kaolin reserves, indicating that yields of at least 70% and up to nearly 80% can be attained over a range of mine types, as a result of the disclosed process.

Example 3

Design-of-Experiments (DOE) Analysis of New Chemistry on Poor Kaolin Reserves

In these experiments, sodium hydroxide is varied from 6.5 to 8 wt %; sodium metasilicate is varied from 5.5 to 7 wt %;

sodium hexametaphosphate is varied from 1.8 to 2.4 wt %; and sodium chloride is varied from 5 to 7 wt %. From the yield and brightness results, a statistical DOE model is constructed. The DOE model predicts that a yield of 78% can be obtained with 91.4 brightness when employing 1.8 wt % sodium hexametaphosphate, 7.94 wt % sodium hydroxide, 6.86 wt % sodium metasilicate, and 5.43 wt % sodium chloride.

Example 4

Design-of-Experiments (DOE) Analysis of New Chemistry on Good Kaolin Reserves

In these experiments, sodium hydroxide is varied from 6.5 to 8 wt %; sodium metasilicate is varied from 5.5 to 7 wt %; sodium hexametaphosphate is varied from 1.6 to 2.2 wt %; sodium chloride is varied from 5 to 7 wt %; and pH is varied from 10.9 to 11.4. From the yield and brightness results, a statistical DOE model is constructed. The DOE model predicts that a yield of 79.3% can be obtained with 91.4 brightness when employing 2.2 wt % sodium hexametaphosphate, 7.4 wt % sodium hydroxide, 6.99 wt % sodium metasilicate, 5.00 wt % sodium chloride, and pH of 11.3.

Example 5

Verification of DOE Predictions from Examples 3 and 4

Based on the predicted optimum conditions from the DOE models, experiments are performed to verify the predictions. The experiments each include the following steps:

(a) providing a kaolin material comprising kaolin clay and titania with titania-associated impurities, wherein the kaolin material is characterized by a crude brightness less than 90;

(b) blunging the kaolin material with water at high shear to form a slurry;

(c) introducing the slurry to one or more beneficiation units for flocculation of the titania and the titania-associated impurities;

(d) introducing a sodium silicate composition, or chemical precursors thereof, to the one or more beneficiation units, wherein the sodium silicate composition is characterized by a $Na_2O/SiO_2$ ratio selected from about 0.25 to about 2.5, and wherein the sodium silicate composition enhances flocculation of the titania while maintaining dispersion of the kaolin clay in the slurry; and (e) recovering a suspension comprising said kaolin clay and subjecting said suspension to one or more chemical leaching reactions to generate a treated kaolin.

FIG. 6 summarizes the data from several experiments for two different mines of different reserve quality. The yield and brightness results agree very well with the model predictions. The data demonstrates that the disclosed process can be optimized to provide a high-brightness, high-yield kaolin process suitable for various naturally occurring kaolin sources.

In this detailed description, reference has been made to multiple embodiments of the disclosure and non-limiting examples relating to how the disclosure can be understood and practiced. Other embodiments that do not provide all of the features and advantages set forth herein may be utilized, without departing from the spirit and scope of the present disclosure. This disclosure incorporates routine experimentation and optimization of the methods and systems described herein. Such modifications and variations are considered to be within the scope of the invention defined by the claims.

All publications, patents, and patent applications cited in this specification are herein incorporated by reference in their entirety as if each publication, patent, or patent application were specifically and individually put forth herein.

Where methods and steps described above indicate certain events occurring in certain order, those of ordinary skill in the art will recognize that the ordering of certain steps may be modified and that such modifications are in accordance with the variations of the disclosure. Additionally, certain of the steps may be performed concurrently in a parallel process when possible, as well as performed sequentially.

Therefore, to the extent there are variations of the disclosure, which are within the spirit of the disclosure or equivalent to the inventions found in the appended claims, it is the intent that this patent will cover those variations as well. The present invention shall only be limited by what is claimed.

What is claimed is:

1. A process for treating mined kaolin, said process comprising:

(a) providing a kaolin material comprising kaolin clay and titania with titania-associated impurities, wherein said kaolin material has a crude brightness less than 90;

(b) blunging said kaolin material with water at high shear to form a slurry;

(c) introducing said slurry to one or more beneficiation units for flocculation of said titania and said titania-associated impurities;

(d) introducing a sodium silicate composition, or precursors thereof, to said one or more beneficiation units, wherein said sodium silicate composition has a $Na_2O/SiO_2$ ratio of about 0.25 to about 2.5, and wherein said sodium silicate composition enhances flocculation of said titania while maintaining dispersion of said kaolin clay in said slurry; and (e) recovering a suspension comprising at least 70% of said kaolin clay and subjecting said suspension to one or more chemical leaching reactions to generate a treated kaolin that has a brightness of about 90 or higher.

2. The process of claim 1, wherein said $Na_2O/SiO_2$ ratio is selected from about 1.0 to about 2.0.

3. The process of claim 2, wherein said $Na_2O/SiO_2$ ratio is not 1.0.

4. The process of claim 3, wherein said $Na_2O/SiO_2$ ratio is greater than 1.0.

5. The process of claim 4, wherein said $Na_2O/SiO_2$ ratio is about 1.8.

6. The process of claim 1, wherein said sodium silicate composition chemically modifies the surface of said kaolin clay.

7. The process of claim 1, wherein said sodium silicate composition chemically modifies the surface of said titania.

8. The process of claim 1, wherein said sodium silicate composition is selected to optimize flocculation of said titania, dispersion of said kaolin clay, or both of these.

9. The process claim 1, wherein said sodium silicate composition is introduced directly into said one or more beneficiation units.

10. The process of claim 1, wherein said sodium silicate composition is introduced indirectly into said one or more beneficiation units via introducing chemical precursors of said sodium silicate composition, and wherein said chemical precursors react in situ, at least in part, to generate said sodium silicate composition.

11. The process of claim 1, said process further comprising introducing one or more additional metals, metal oxides, metal hydroxides, metal salts, minerals, and/or polymers to step (b) and/or step (c) to adjust said dispersion of said kaolin clay in said slurry.

12. The process of claim 11, wherein sodium metaphosphate is introduced in step (b) and/or step (c).

13. The process of claim 11, wherein sodium metasilicate is introduced in step (b) and/or step (c).

14. The process of claim 11, wherein an anionic high-molecular-weight polymer is introduced in step (b) and/or step (c).

15. The process of claim 11, wherein step (d) is further enhanced by the addition of a salt.

16. The process of claim 15, wherein said salt is sodium chloride.

17. The process of claim 11, said process further comprising one or more chemical leaching reduction reactions.

18. The process of claim 1, wherein said suspension comprises at least 75% of said kaolin clay.

19. The process of claim 18, wherein said suspension comprises at least 80% of said kaolin clay.

20. The process claim 1, wherein said treated kaolin is characterized by a brightness of about 91 or higher.

21. The process of claim 20, wherein said treated kaolin is characterized by a brightness of about 91.5.

* * * * *